US010808795B2

(12) United States Patent
Heon et al.

(10) Patent No.: US 10,808,795 B2
(45) Date of Patent: Oct. 20, 2020

(54) VIBRATION ISOLATION SYSTEM

(71) Applicant: ARNOTT, LLC, Meritt Island, FL (US)

(72) Inventors: Reno N. Heon, Grover Beach, CA (US); Dustin B. Heon, Arroyo Grande, CA (US)

(73) Assignee: ARNOTT, LLC, Merritt Island, FL (US)

( * ) Notice: Subject to any disclaimer, the term of this patent is extended or adjusted under 35 U.S.C. 154(b) by 140 days.

(21) Appl. No.: 16/169,808

(22) Filed: Oct. 24, 2018

(65) Prior Publication Data

US 2019/0128366 A1   May 2, 2019

Related U.S. Application Data

(60) Provisional application No. 62/578,250, filed on Oct. 27, 2017.

(51) Int. Cl.
*F16F 15/08* (2006.01)
*F04B 39/12* (2006.01)
(Continued)

(52) U.S. Cl.
CPC .............. *F16F 15/08* (2013.01); *F04B 39/00* (2013.01); *F04B 39/0044* (2013.01);
(Continued)

(58) Field of Classification Search
CPC .......... F16F 1/16; F16F 1/3849; F16F 7/1011; F16F 7/116; F16F 7/14; F16F 7/00;
(Continued)

(56) References Cited

U.S. PATENT DOCUMENTS 1,880,953 A * 10/1932 Fageol ...................... B61C 3/00
 105/4.4
2,115,361 A   4/1938 Daggett
(Continued)

FOREIGN PATENT DOCUMENTS

CN      204077294 U  *  1/2015
FR         1095983      6/1955
WO   WO 2005/015074   2/2005

OTHER PUBLICATIONS

SPEC-D, Air Compressor Tank Pump, SKU AH-CMP0015, available at: http://www.specdtuning.com/ah-cmp0015.html, retrieved Aug. 29, 2016.
(Continued)

*Primary Examiner* — Robert A. Siconolfi
*Assistant Examiner* — San M Aung
(74) *Attorney, Agent, or Firm* — Barnes & Thornburg LLP; Mark J. Nahnsen

(57) ABSTRACT

A vibration isolation system for compactly mounting a vibrating component, such as an air compressor, to an object, such as an air tank, is described. The system may include a rod and bumper system to isolate the vibrations generated by the air compressor from the vehicle or object that it is mounted to. A primary isolation subsystem may include a rod suspension design which consumes significantly less space than existing solutions. The rod is able to achieve equal spring rates in any direction.

20 Claims, 10 Drawing Sheets

(51) Int. Cl.
*F16F 15/06* (2006.01)
*F04B 39/00* (2006.01)
*F16F 1/38* (2006.01)
*F16F 13/14* (2006.01)
*F16F 15/02* (2006.01)
*F16F 1/16* (2006.01)

(52) U.S. Cl.
CPC .......... *F04B 39/121* (2013.01); *F04B 39/123* (2013.01); *F16F 1/3849* (2013.01); *F16F 13/14* (2013.01); *F16F 15/022* (2013.01); *F16F 15/06* (2013.01); *F16F 1/16* (2013.01)

(58) Field of Classification Search
CPC .. F16F 13/14; F16F 15/06; F16F 15/08; F16F 15/02; F16F 15/022; F16F 15/067; F16F 15/04; F16F 6/00; F04B 39/00; F04B 39/0044; F04B 39/121; F04B 39/123; F04B 49/022; F04B 49/06; F04B 49/08; H05K 5/0217
USPC .......................................................... 267/136
See application file for complete search history.

(56) References Cited

U.S. PATENT DOCUMENTS

| | | | |
|---|---|---|---|
| 2,548,934 A | 4/1951 | Patrick | |
| 2,766,903 A | 10/1956 | Boni | |
| 2,860,809 A | 11/1958 | Perry | |
| 2,954,892 A | 10/1960 | Dpsler | |
| 3,256,069 A | 6/1966 | Peterson | |
| 3,279,645 A | 10/1966 | Harvey | |
| 3,392,848 A | 7/1968 | McConnell et al. | |
| 3,887,304 A | 6/1975 | Otaki et al. | |
| 4,040,284 A | 8/1977 | Fuchs, Jr. | |
| 5,054,740 A * | 10/1991 | Wheeler | F04B 41/02 248/154 |
| 5,230,539 A | 7/1993 | Olson | |
| 5,279,323 A | 1/1994 | Grove | |
| 5,810,309 A | 9/1998 | Augustine et al. | |
| 6,056,007 A | 5/2000 | Gochenouer et al. | |
| 6,155,524 A | 12/2000 | Legler et al. | |
| 6,224,117 B1 | 5/2001 | Olson et al. | |
| 6,675,831 B2 | 1/2004 | Sakaguchi et al. | |
| 6,834,674 B2 | 12/2004 | Koschany et al. | |
| 8,534,467 B2 | 9/2013 | Haas et al. | |
| 10,436,386 B2 | 10/2019 | Heon et al. | |
| 2005/0103959 A1 | 5/2005 | Lee | |
| 2013/0251557 A1* | 9/2013 | Ota | H02K 15/14 417/410.1 |

OTHER PUBLICATIONS

International Preliminary Report on Patentability dated Oct. 21, 2019 in International Patent Application No. PCT/US2018/057395 filed on Oct. 24, 2018.
PCT International Search Report and Written Opinion, in PCT Int'l. App. No. PCT/US2018/057395, in 15 pages, dated Feb. 22, 2019.

* cited by examiner

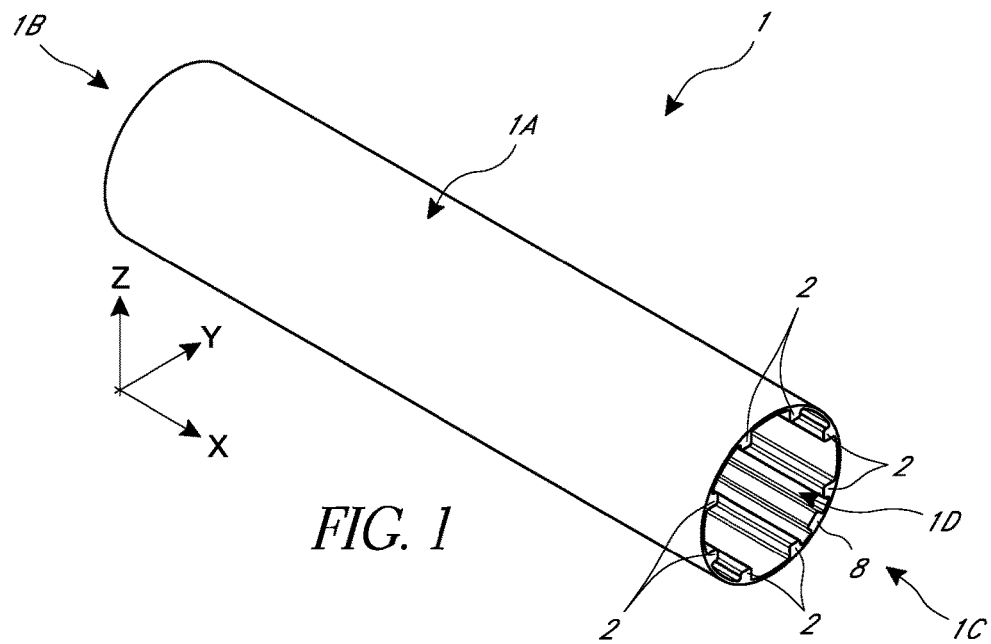
FIG. 1
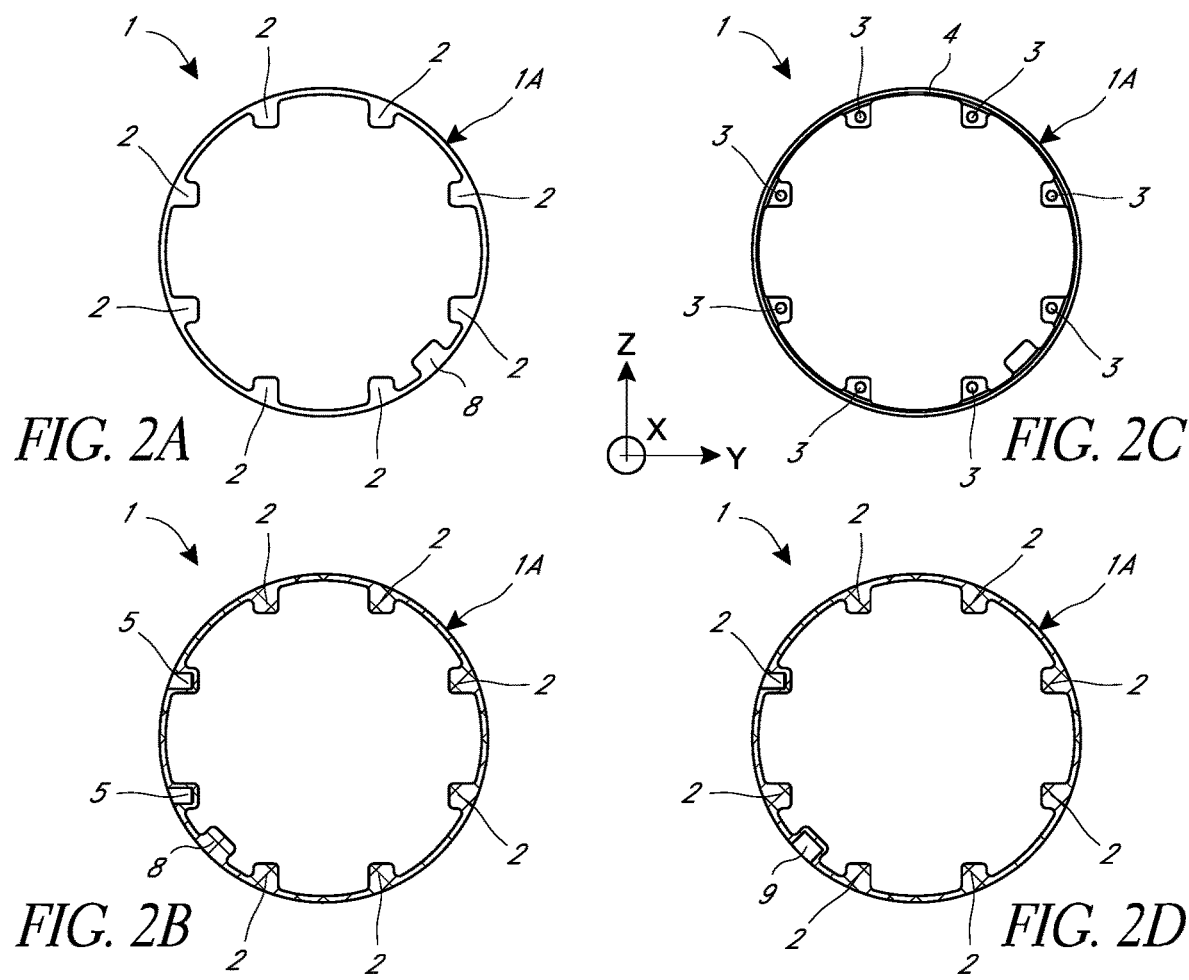
FIG. 2A
FIG. 2B
FIG. 2C
FIG. 2D

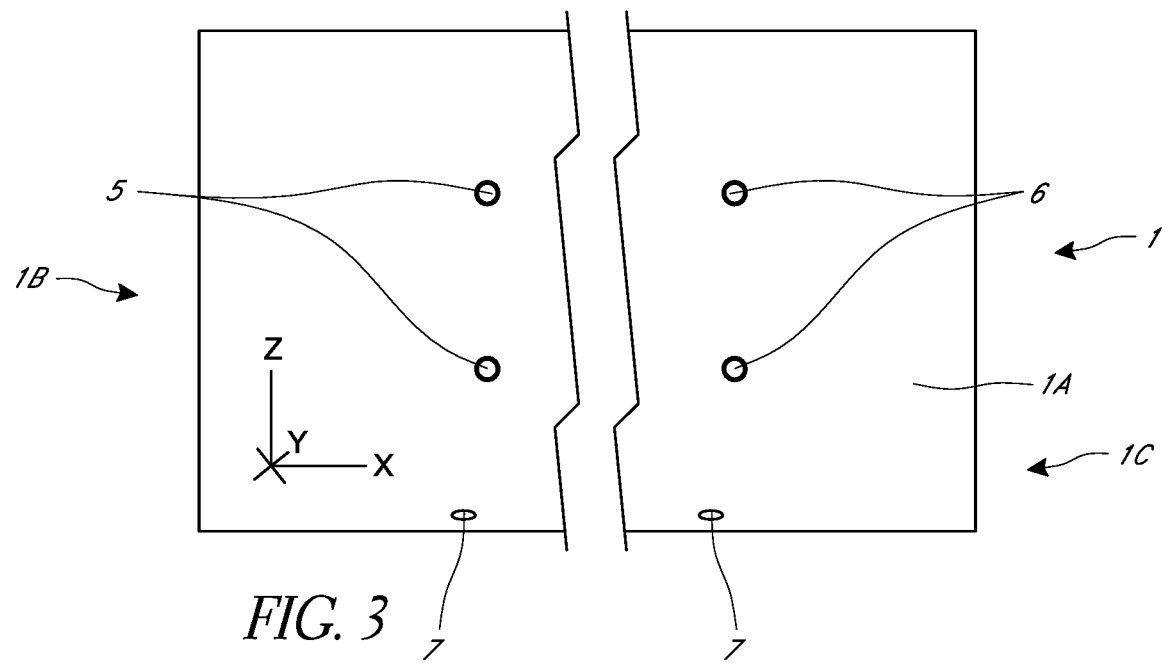
FIG. 3
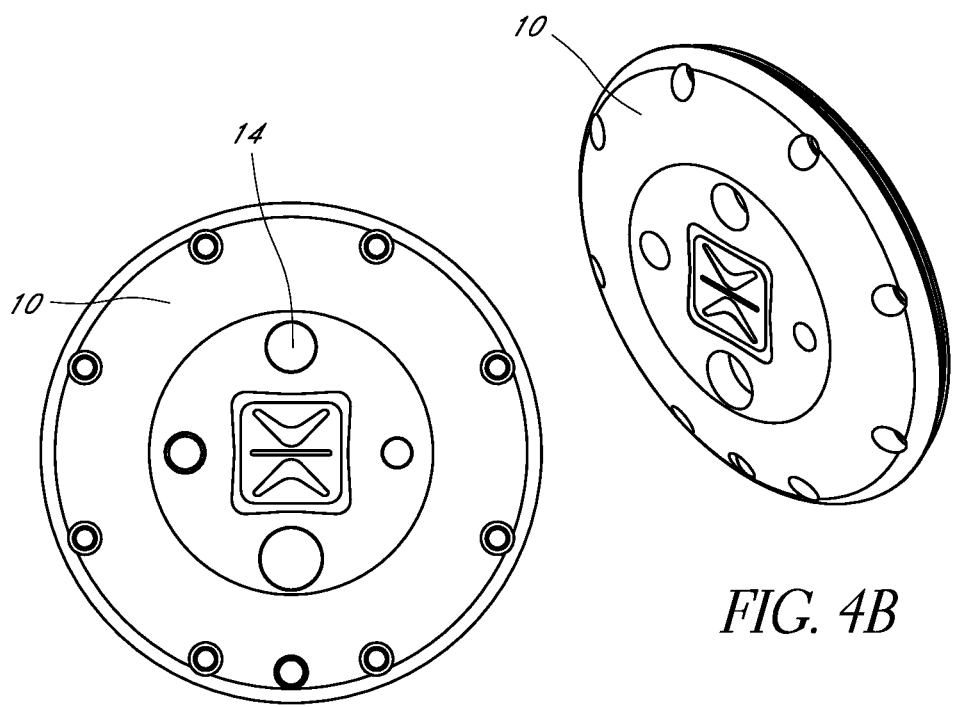
FIG. 4A
FIG. 4B

VIBRATION ISOLATION SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application claims the benefit of priority of U.S. provisional application No. 62/578,250, filed Oct. 27, 2017, and entitled "VIBRATION ISOLATION SYSTEM," the entire contents of which are incorporated herein by reference for all purposes and form a part of this specification.

TECHNOLOGY BACKGROUND

Field

The technology relates to vibration isolation. In particular, a vibration isolation system for mounting and attenuating the vibrations from a vibrating component, such as a compressor, is described.

Description of the Related Technology

Air Compressors and other vibrating components, in vehicle and other contexts, are typically mounted with mounting systems that require significant packaging space and only work in a single mounting orientation with respect to gravity. Solutions that address these and other drawbacks for mounting vibrating components are therefore desirable.

SUMMARY OF VARIOUS FEATURES

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Embodiments," one will understand how the features of the embodiments described herein provide advantages over existing systems, devices and methods for vibration isolation.

A vibration isolation system for mounting a component that vibrates, such as an air compressor, to an object, such as an air tank and/or vehicle, is described. The system may include a primary spring having a spring rod and a secondary spring having a bumper stop, such as a polymer bumper stop, to isolate the vibrations generated by the air component from the vehicle or object to which it is mounted. A primary isolation subsystem may include a novel spring rod suspension design which consumes significantly less space than existing solutions. This spring rod may achieve equal spring rates in multiple or any direction (e.g. omnidirectional), unlike existing devices which are only designed to operate in a primary axis (e.g., typical coil springs work in the axial direction only). This advantage of the current development allows the component to be mounted at any rotation angle and achieve the same isolation characteristics. A secondary isolation subsystem may include a bumper stop to inhibit or limit axial travel of the vibrating component relative to the mounted location.

In one aspect, a vibration isolation system for mounting a compressor to a vehicle is described. The system comprises an elongated support tube, a bracket, a first rod and a first coupling. The elongated support tube extends from a first end to a second end, with each end configured to couple with a mount of the vehicle. The bracket is configured to be supported along the length of the elongated support tube. The first rod is configured to couple with and extend from the bracket in a first direction along the elongated support tube to a first end of the first rod. The first stop is configured to couple with a first attachment of the compressor and to be located between the first attachment of the compressor and a first attachment of the mount of the vehicle, with the first stop configured to at least partially receive the first rod therethrough. The first coupling is configured to attach to the first end of the first rod and to the first attachment of the compressor.

Various embodiments of the various aspects may be implemented. In some embodiments, the vibration isolation system may further comprise a second rod, a second stop, and a second coupling. The second rod may be configured to couple with and extend from the bracket in a second direction that is different from the first direction along the elongated support tube to a first end of the second rod. The second stop may be configured to couple with a second attachment of the compressor and to be located between the second attachment of the compressor and a second attachment of the mount of the vehicle, with the second stop configured to at least partially receive the second rod therethrough. The second coupling may be configured to attach to the first end of the second rod and to the second attachment of the compressor.

In some embodiments, the first stop is configured to be received into a pocket of the first attachment of the mount of the vehicle, with the pocket having an inner radial width that is greater than an outer radial width of the first stop. In some embodiments, the first rod extends along a longitudinal axis and has an equal bending stiffness about two or more axes that are located in a plane that is perpendicular to the longitudinal axis. In some embodiments, the elongated support tube extends along an axis, the first direction in which the first rod extends from the bracket is at an angle with respect to the axis, the elongated support tube is configured to rotate to cause the first rod to extend from the bracket in a second direction with respect to the axis, and where the second direction is different from the first direction.

In another aspect, a vibration isolation system for mounting a compressor to a vehicle is described. The vehicle has a first attachment spaced axially from a second attachment. The vibration isolation system comprises an elongated support and a damper. The elongated support extends along an axis from a first end to a second end, with the first and second ends of the elongated support respectively configured to have a cantilevered connection at the first and second attachments of the vehicle, and the elongated support configured to support the compressor near the first and second ends of the elongated support. The damper is configured to be supported by the elongated support at a location along a length of the elongated support between the first and second attachments, where the damper is configured to counter oscillations of the elongated support due to vibrations from the compressor.

Various embodiments of the various aspects may be implemented. In some embodiments, the first and second attachments of the vehicle each have an axially inward facing side and an opposite axially outward facing side, the damper is configured to be supported by the elongated support at a location on the axially inward facing sides of the first and second attachments, and the elongated support is configured to support the compressor at locations of the elongated support that are on the axially outward facing sides of the first and second attachments.

In some embodiments, the elongated support comprises a support tube and one or more elongated rods. The support tube is configured to be coupled with the first and second attachments of the vehicle. The one or more elongated rods extend through the support tube, with the one or more elongated rods configured to extend through the first and second attachments of the vehicle and to support the compressor at locations on the axially outward facing sides of the first and second attachments. In some embodiments, the one or more elongated rods are configured to extend through and to be radially restrained by the first and second attachments of the vehicle. In some embodiments, the vibration isolation system further comprises one or more stops, where the one or more elongated rods are configured to couple with and be axially restrained by the one or more stops, and the one or more stops are configured to be located on the axially outward facing sides of the first and second attachments. In some embodiments, the one or more elongated rods comprises a first rod and a second rod, with the first rod configured to extend from the damper in a first direction to a first end of the first rod that is located on the outward facing side of the first attachment of the vehicle, and the second rod configured to extend from the damper in a second direction that is different than the first direction to a first end of the second rod located on the outward facing side of the second attachment of the vehicle.

In some embodiments, the vibration isolation system further comprises one or more flexible couplings configured to couple the elongated support to the compressor at each of the first and second ends of the elongated support. In some embodiments, the elongated support comprises a support tube and one or more elongated rods, and the one or more flexible couplings are configured to couple the one or more elongated rods to the compressor.

In some embodiments, the vibration isolation system further comprises one or more stops, where the elongated support is configured to couple with and be axially restrained by the one or more stops near the first and second attachments of the vehicle. In some embodiments, the elongated support comprises a support tube and one or more elongated rods, and the one or more stops are configured to be located between the first and second attachment of the vehicle and a respective first and second attachment of the compressor.

In some embodiments, the elongated support comprises a support tube and one or more rods, where the support tube is configured to extend along the axis, and the one or more rods are configured to extend at a first angle to the axis in a first direction prior to attaching the compressor to the vehicle, to account for deflections of the one or more rods due to the weight of the compressor. In some embodiments, the support tube is configured to rotate to thereby cause the one or more rods to extend at a second angle to the axis in a second direction, where the second direction is different from the first direction.

In some embodiments, the elongated support comprises one or more rods, each of the one or more rods each configured to extend along a respective longitudinal axis and having an equal bending stiffness about two or more axes that are located in a plane that is perpendicular to the respective longitudinal axis.

In another aspect, a vibration isolation system for mounting a component to a mount associated with a vehicle is described. The mount has a first attachment spaced axially from a second attachment, and the first and second attachments of the mount each have an axially inward facing side and an opposite axially outward facing side. The vibration isolation system comprises an elongated support and a damper. The elongated support extends axially from a first end to a second end with a middle portion located between the first and second ends, with the elongated support configured to extend between and to be supported by the first and second attachments with the middle portion located between the first and second attachments, and with the first and second ends respectively supporting the component at locations on the axially outward facing sides of the first and second attachments. The damper is configured to be supported by the middle portion of the elongated support, where the damper is configured to counter oscillations of the elongated support due to vibrations from the component.

Various embodiments of the various aspects may be implemented. In some embodiments, the middle portion of the elongated support is configured to behave mechanically as a simply supported beam.

In some embodiments, the elongated support comprises a support tube and one or more elongated rods. The support tube is configured to be coupled with the first and second attachments of the mount. The one or more elongated rods extend through the support tube, with the one or more elongated rods configured to extend through the first and second attachments of the mount and to support the component at locations on the axially outward facing sides of the first and second attachments. In some embodiments, the one or more elongated rods are configured to extend through and to be radially restrained by the first and second attachments of the vehicle.

In some embodiments, the elongated support comprises a support tube and one or more rods, where the support tube is configured to extend axially, and the one or more rods are configured to extend at an angle to the support tube prior to attaching the component to the mount, to account for deflections of the one or more rods due to the weight of the component.

In some embodiments, the elongated support comprises one or more rods, each of the one or more rods configured to extend along a respective longitudinal axis and having an equal bending stiffness about two or more axes that are located in a plane that is perpendicular to the respective longitudinal axis.

In another aspect, a vibration isolation system for mounting a component to a mount is described. The system comprises a first stop, a first rod and a first coupling. The first stop is configured to restrain the system relative to the mount. The first rod is configured to extend axially through the first stop to a first end of the first rod. The first coupling is configured to attach to the first end of the first rod. The first coupling and the first rod are configured to restrain the system relative to the component. In some embodiments, the vibration isolation system may further comprise an elongated support extending axially from a first end to a second end, each end configured to couple with the mount, and a bracket configured to be supported by the elongated support, where the bracket is configured to support the first rod.

In some embodiments, the vibration isolation system may further comprise a second stop, a second rod, and a second coupling. The second stop may be configured to restrain the system relative to the mount. The bracket may be configured to support the second rod. The second rod may be configured to extend axially through the second stop to a first end of the second rod. The second coupling may be configured to attach to the first end of the second rod. The second coupling and the second rod may be configured to restrain the system relative to the component. In some embodiments, the first rod may extend along a longitudinal axis and be configured to attenuate vibrations in a plane that is perpendicular to the longitudinal axis.

In another aspect, a vibration isolation system for mounting a compressor to a pressure vessel is described. The system comprises a first support tube, a first center bracket, a first spring rod, a first polymer bump stop and a first flexible coupling. The first support tube is elongated along a first longitudinal axis from a first end to a second end, with the first support tube having an opening extending therethrough, and the first and second ends of the first support tube configured to couple with the pressure vessel. The first center bracket is supported inside the first support tube, with the first center bracket extending from a first side to a second side that is opposite the first side. The first spring rod extends axially from a first end that is configured to attach to the first center bracket, with the first spring rod configured to extend from the first side of the first center bracket through the opening in the first support tube to a second end of the first spring rod. The first polymer bump stop is configured to couple with the compressor and to be received within a pocket of a first mounting bracket of the pressure vessel, with the first polymer bump stop defining a channel therethrough, where the first spring rod is configured to extend through the first mounting bracket and the channel of the first polymer bump stop to the second end of the first spring rod. The first flexible coupling is configured to attach to the second end of the first spring rod and to a first compressor mounting bracket.

Various embodiments of the various aspects may be implemented. In some embodiments, the vibration isolation system may further comprise a second spring rod, a second polymer bump stop and a second flexible coupling. The second spring rod extends axially from a first end that is configured to attach to the first center bracket, with the second spring rod configured to extend from the second side of the first center bracket through the opening in the first support tube to a second end of the second spring rod. The second polymer bump stop is configured to couple with the compressor and to be received within a pocket of a second mounting bracket of the pressure vessel, with the second polymer bump stop defining a channel therethrough, where the second spring rod is configured to extend through the second mounting bracket and the channel of the second polymer bump stop to the second end of the second spring rod. The second flexible coupling is configured to attach to the second end of the second spring rod and to a second compressor mounting bracket.

In some embodiments, the vibration isolation system further comprises a second support tube, a second center bracket, a third spring rod, a third polymer bump stop, a third flexible coupling, a fourth spring rod, a fourth polymer bump stop and a fourth flexible coupling. The second support tube is elongated along a second longitudinal axis from a first end to a second end, with the second support tube having an opening extending therethrough, and the first and second ends of the second support tube configured to couple with the pressure vessel. The second center bracket is supported inside the second support tube, the second center bracket extending from a first side and a second side opposite the first side. The third spring rod extends axially from a first end that is configured to attach to the second center bracket, and the third spring rod is configured to extend from the first side of the second center bracket through the opening in the second support tube to a second end of the third spring rod. The third polymer bump stop is configured to couple with the compressor and to be received within a pocket of a third mounting bracket of the pressure vessel, with the third polymer bump stop defining a channel therethrough, where the third spring rod is configured to extend through the third mounting bracket and the channel of the third polymer bump stop to the second end of the third spring rod. The third flexible coupling is configured to attach to the second end of the third spring rod and to a third compressor mounting bracket. The fourth spring rod extends axially from a first end that is configured to attach to the second center bracket, with the fourth spring rod configured to extend from the second side of the second center bracket through the opening in the second support tube to a second end of the fourth spring rod. The fourth polymer bump stop is configured to couple with the compressor and to be received within a pocket of a fourth mounting bracket of the pressure vessel, with the fourth polymer bump stop defining a channel therethrough, where the fourth spring rod is configured to extend through the fourth mounting bracket and the channel of the fourth polymer bump stop to the second end of the fourth spring rod. The fourth flexible coupling is configured to attach to the second end of the fourth spring rod and to a fourth compressor mounting bracket.

In some embodiments, each spring rod is configured to couple with the respective first or second center bracket at an angle with respect to the respective first or second longitudinal axis of the respective first or second support tube. In some embodiments, each spring rod has equal bending stiffness at any angle relative to an axial direction of the respective spring rod. In some embodiments, each spring rod has a circular cross-section. In some embodiments, each polymer bump stop is configured to restrict axial movement of the compressor. In some embodiments, each polymer bump stop is configured to restrict radial movement of the compressor. In some embodiments, the vibration isolation system is configured to mount the compressor inside the pressure vessel.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, can be arranged, substituted, combined, and designed in a wide variety of different configurations, all of which are explicitly contemplated and make part of this disclosure.

FIG. 1 is a perspective view of an embodiment of a center section for a modular pressure vessel.

FIGS. 2A-2D depict several end views and cross-section views of several embodiments of the center section of FIG. 1.

FIG. 3 is a broken side view of another embodiment of a center section for a modular pressure vessel.

FIGS. 4A and 4B depict, respectively, front and perspective views of an embodiment of an end-cap which may be used with the center section of FIG. 1 for a modular pressure vessel.

DETAILED DESCRIPTION OF CERTAIN ILLUSTRATIVE EMBODIMENTS

Figure 5A:
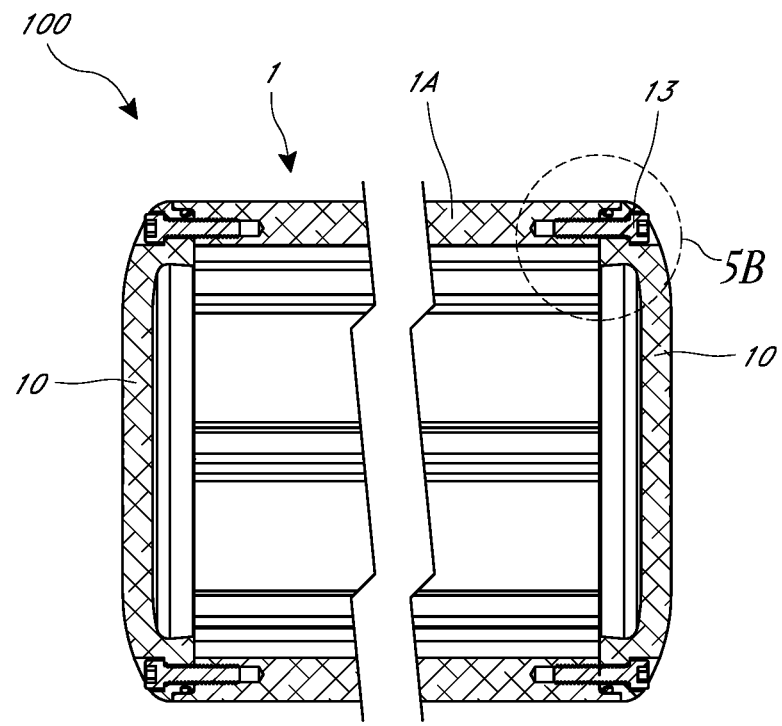
FIG. 5A is a broken, longitudinal cross-sectional view of an embodiment of a modular pressure vessel incorporating the center section of FIG. 1 and the end-cap of FIG. 4 attached to two ends of the center section.

The following detailed description is directed to certain specific embodiments. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Embodiments of the development will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the invention described herein.

The vibration isolation system described herein may be used in a variety of applications, including but not limited to automotive air suspension systems, automotive auxiliary air supply systems, portable general use air supply systems (e.g., tire filling, air tool equipment), industrial air generation and storage systems (e.g., garage, shops, equipment, robotics), and others. The system design reduces the noise, vibration, and harshness (NVH) typically produced by an air compressor system. It offers the end-user consistent performance and mounting flexibility by allowing the air reservoir and compressor assembly to be installed in any orientation with respect to gravity.

The system may include omni-directional isolation capabilities. A spring or spring-like element may provide non-rigid means for positioning and isolating a vibrating object. The spring's stiffness in the direction of operation yields a spring rate which is selected based on the mass of the object that it is supporting and the common frequency of operation of the object. For the application of isolating a constantly vibrating object like an air compressor from the object that it is mounted to, the spring should have a low damping coefficient (or low hysteresis) in order to improve the isolation (or reduce the transmissibility).

The system occupies a small volume and creates a minimal footprint. This negates the requirement for constant re-packaging and engineering anytime the compressor is designed to fit within a specific vehicle or packaging requirement. The engineering cost is thus low and negates the need for revalidation of durability in the field for each new application. Thus, some advantages among others of the system include reduced packaging space, universal solution that prevents the need for re-engineering the mounting system for every application, omnidirectional mounting orientation, and others.

FIGS. 1-10D relate to various aspects of a pressure vessel 100. The vessel 100 is one example of how a vibration isolation system 311, described herein, may be used. Further details of an embodiment of the vibration isolation system 311 are shown and described herein with respect to FIGS. 11-14. Some details of the vessel 100 are described herein. The vessel 100 and related features are more fully described in U.S. patent application Ser. No. 15/694,701, filed Sep. 1, 2017, and titled "Systems, Devices and Methods for Modular Pressure Vessels," the entirety of which is incorporated herein by reference for all purposes and forms a part of this specification. Further, the vibration isolation system 311 may be employed in various contexts involving vibration isolation other than just pressure vessels and vehicles, as further described herein.

Figure 6:
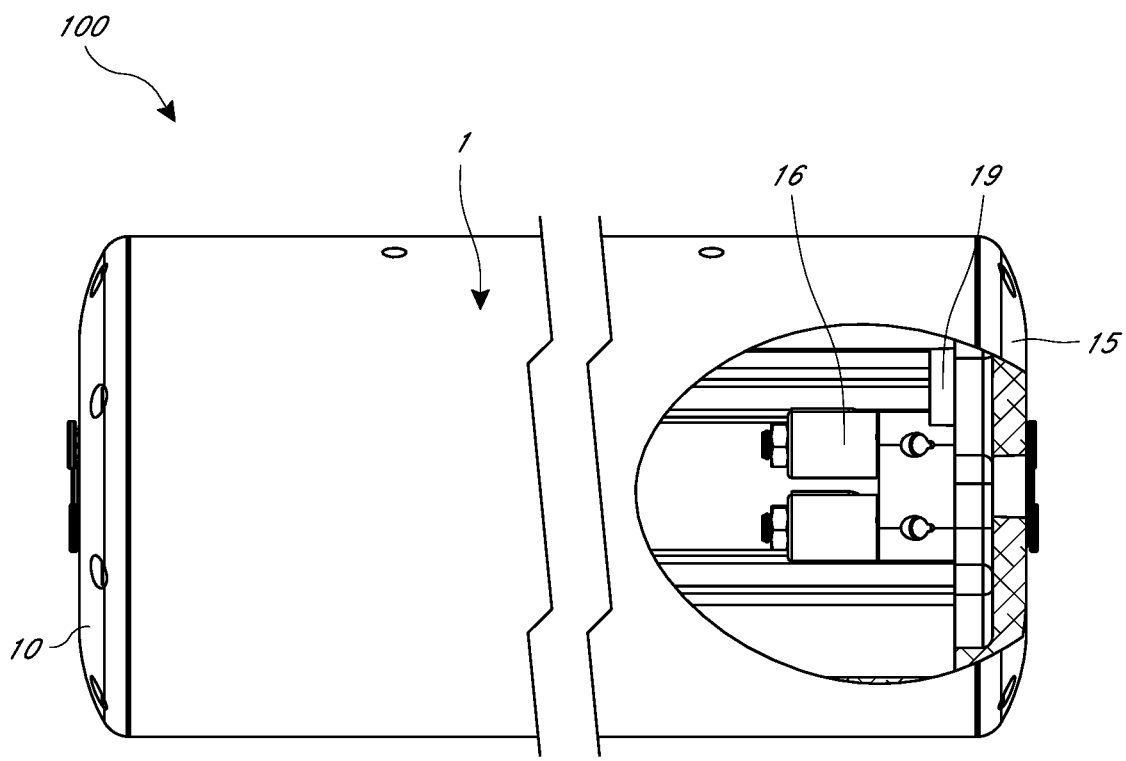
FIG. 6 is a broken side view of an embodiment of a modular pressure vessel having another embodiment of an end-cap integrated with the center section, with a portion of the pressure vessel removed for clarity to show some internal components.

FIG. 1 is a perspective view of an embodiment of a center section 1 for the vessel 100. FIGS. 2A-2D depict two end views (FIGS. 2A and 2C) and two cross-section views (FIGS. 2B and 2D) of several embodiments of the center section 1. The views of FIGS. 2A-2D are in planes that are parallel to the YZ plane. The modular pressure vessel 100, an embodiment of which is shown in FIG. 6, may utilize removable end fittings such as end-caps 10 as shown fastened to both ends of a center section 1 in order to yield a closed pressure vessel 100. While certain features and/or functionalities may be described with respect to the pressure vessel 100, the same or similar features and/or functionalities may apply to other embodiments of the pressure vessel, such as the pressure vessels 100, 100A, etc. described herein.

The center section 1 includes a wall 1A, which may be referred to as a sidewall. The wall 1A surrounds and at least partially defines an outer boundary along the longitudinal length (in the X direction) of the center section 1. The center section 1 includes a first opening 1B at a first end of the center section 1 and a second opening 1C at a second opposite end of the center section 1. A longitudinal opening extends through the center section 1 from the first opening 1B to the second opening 1C. Thus, there may be multiple thin, longitudinal segments of the wall 1A, for example in between adjacent rails 2 and/or 8 (as further described herein).

The center section 1 may define a cavity 1D therein. In some embodiments, the vibration isolation system 311 may be located inside the cavity 1D, as further described herein. The interior side of the wall 1A may define the cavity 1D or portions thereof. The openings 1B, 1C at either end may be at the end of the cavity 1D. The center section 1 generally can have any hollow shape that enables housing and/or storage of a fluid, e.g. gas phase material. The center section 1 as shown has a cylindrical shape. The openings 1B, 1C may have corresponding shapes. The inner width, e.g. inner diameter, of the center section 1 as measured in the YZ plane and/or planes parallel thereto may be various sizes or ranges of sizes. In some embodiments, the inner width may be from about three inches to about one hundred inches, from about four inches to about fifty inches, from about five inches to about thirty-six inches, from about six inches to about twenty-four inches, from about six inches to about twelve inches, or other greater or smaller ranges or sizes.

The center section 1 may have a length measured along the X-axis from the first opening 1B to the second opening 1C that is of various sizes or ranges of sizes. This length may be from about six inches to about one hundred inches, from about eight inches to about seventy-two inches, from about ten inches to about sixty inches, from about eleven inches to about forty-eight inches, from about twelve inches to about thirty-six inches, from about twelve inches to about twenty-four inches, or other greater or smaller ranges or sizes. The vibration isolation system 311 described herein may fit within any combination of the lengths and widths described herein for the center section 1.

The pressure vessel center section 1 may be manufactured by a method of extrusion. In some embodiments, the center section 1 includes one or more rails 2 and/or 8. The rails 2 and/or 8 may be longitudinal rails that extend axially along the X-axis as indicated at least partially along the longitudinal length of the center section 1. The rails 2, 8 may include attachment portions or features that allow for attaching components inside the pressure vessel 100. The rails 2 and/or 8 may provide attachments for the vibration isolation system 311, as further described herein. The rails 2, 8 may include attachment features that allow for attaching components outside the pressure vessel 100. The rails 2, 8 may include attachment features that allow for securing the pressure vessel 100 to a mount, support or other structure, such as an automotive support structure, etc. The various attachment features described herein may be used for attaching components in or on the pressure vessel 100, including attaching the pressure vessel 100 to other structures, or vice versa.

FIG. 3 is a broken side view of the pressure vessel center section 1. Attachment features, shown as threads 5,6,7, may be female mounting threads. Other type of attachments alternatively or in addition to threads may be used. The threads 5,6,7 may be used for the purpose of mounting the pressure vessel 100 to an object and/or mounting other components to the outside of the pressure vessel 100.

Figure 5B:
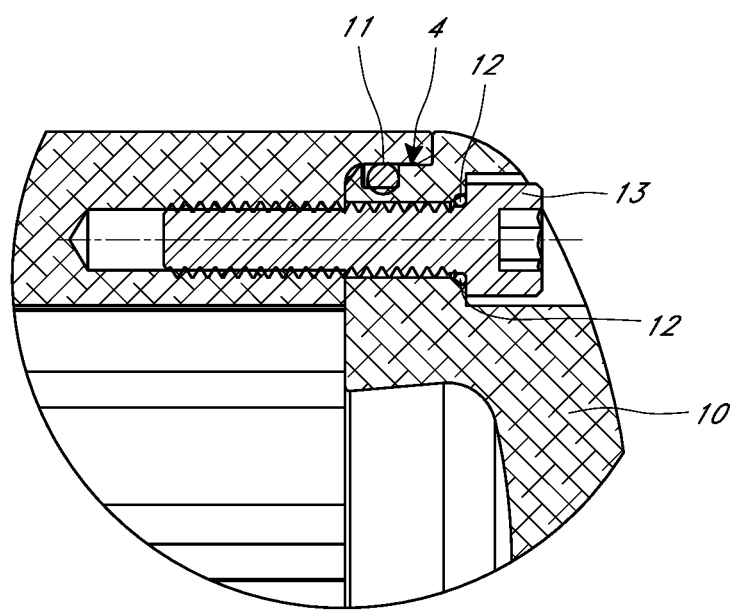
FIG. 5B is a detail view the region 5B identified in FIG. 5A and showing a detail of an interface between the center section and an end-cap.

FIGS. 4A and 4B depict front and perspective views of an embodiment of the end fitting, shown as the end-cap 10, which may be used with the center section 1 for a modular pressure vessel 100. FIG. 5A is a broken longitudinal cross-sectional view of the modular pressure vessel 100 incorporating the center section 1 and two of the end-caps 10 attached to two ends of the center section 1. FIG. 5B is a detail view showing a detail of an interface between the center section 1 and an end-cap 10, taken from the portion 5B identified in FIG. 5A. The end-caps 10 may be used to seal the ends of the center section 1. The end-caps 10 may be swapped with other end fittings or end-caps, such as the integrated end-caps 15 having components, instruments, etc. integrated therewith, as described herein. Thus, the end-caps 10 may be modular such that other components may be used with the same center section 1. Further, features described herein with respect to the end-caps 10 are understood to apply equally to other end fittings that may be incorporated, such as the end-caps 15, etc.

As shown in FIGS. 5A and 5B, the end-caps 10 can include seals 11 and 12. Seals 11, 12 may assist for example with achieving highly reliable sealing of the center section 1. The removable end-cap 10 may be mounted on each end of the center section 1. A fastening mechanism incorporating the seals 11 and/or 12 may provide sealing between the center section 1 and the removable end-caps 10. The seals 11 and/or 12 may be a variety of different types of seals. In some embodiments, the seals 11 and/or 12 may be or include O-rings. The seals 11 and/or 12 may be annular O-rings. In some embodiments, the seals 11 and/or 12 may be or include gaskets. The seals 11 and/or 12 may be other types of seals, including adhesives, sealants, gas sealing washers, flange gaskets, O-ring boss seals, other types of seals, or combinations thereof.

FIG. 6 is a broken side view of another embodiment of the modular pressure vessel 100 having the end-cap 10 and an end-cap 15 integrated with the center section 1, with a portion of the pressure vessel 100 removed for clarity showing internal components. The end-cap 15 is an embodiment of an "integrated" end-cap that has various features integrated in, on or otherwise with the end-cap 15. The intergrated end-cap 15 may include any of a number various features, for example manifolding components, porting components, affixing features, electrical bulkheads, other components, or combinations thereof.

Figure 7A:
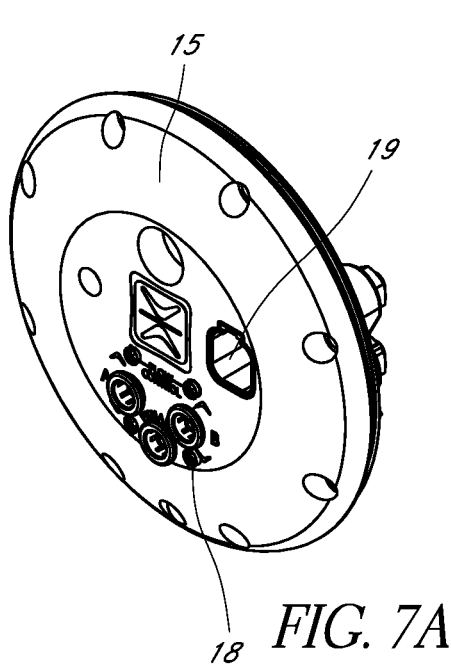
FIGS. 7A and 7B are, respectively, front and rear perspective views of the end-caps of FIG. 6, shown detached from the center section.
Figure 7B:
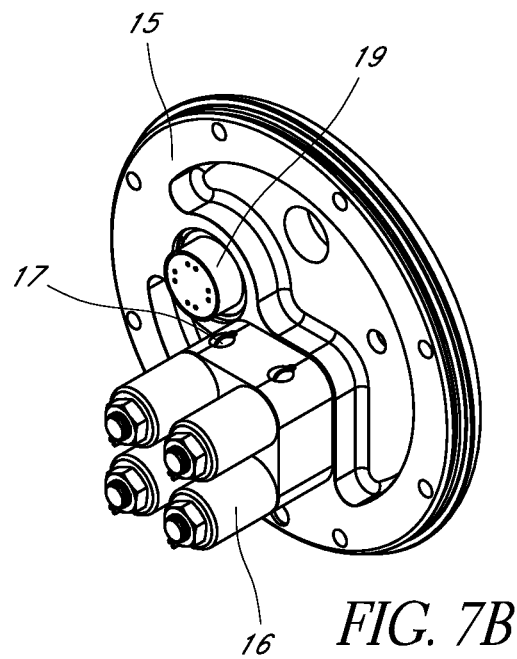

FIGS. 7A and 7B show, respectively, front and rear perspective views of the end-cap 15, shown detached from the center section 1. The atmospheric (external) side of the end-cap 15 is shown in FIG. 7A as oriented and the pressurized (internal) side of the end-cap 15 is shown in FIG. 7B as oriented. The end-cap 15 may include various integrate features. As shown in the exemplary embodiment, the end-cap 15 includes electronic solenoid valves 16, inlet filters 17, flow control valves 18, and a high pressure electrical bulkhead 19. Further details of the end-cap 15 and example integrated components are provided herein, for example in the section "Integrated End-Cap Assembly."

Some embodiments disclosed herein relate to the modular pressure vessel 100 with the integration of an electric air compressor mounted entirely inside of the pressure vessel 100. The compressor may be mounted using the vibration isolation system 311 described herein.

Figure 8:
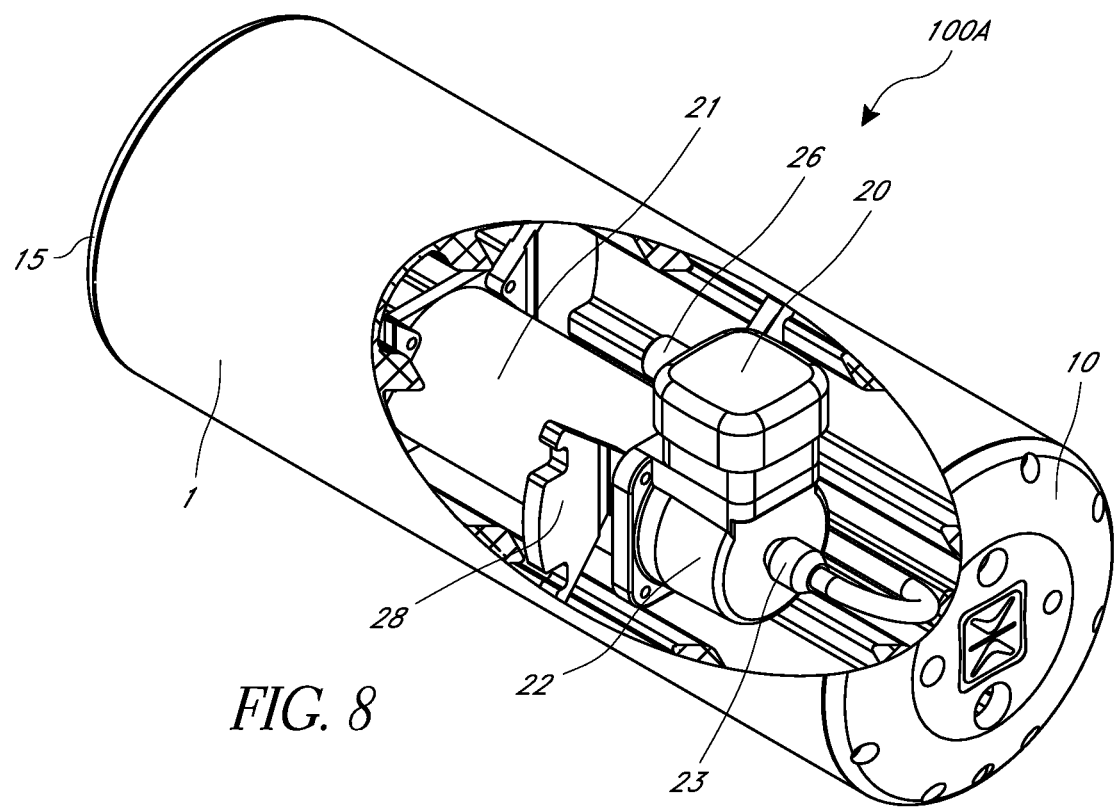
FIG. 8 is a perspective side view of another embodiment of a modular pressure vessel, with a portion of the body removed for clarity to show some internal components.
Figure 9:
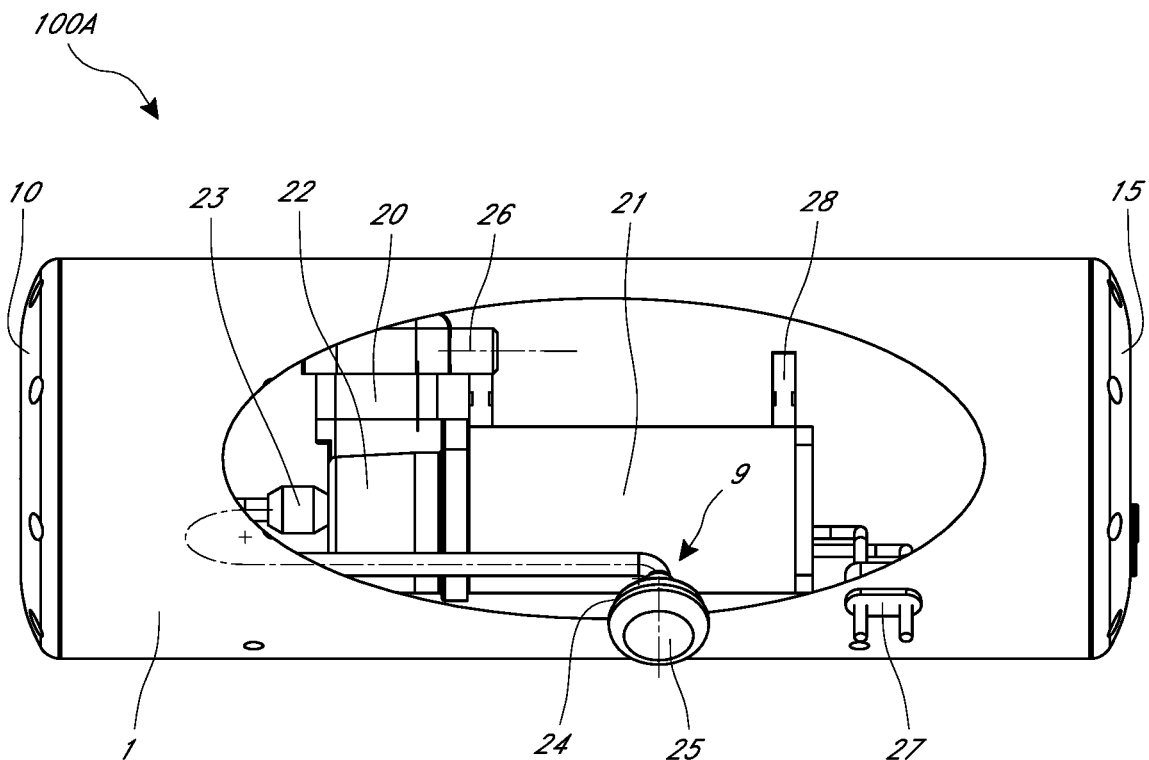
FIG. 9 is a schematic top plan view of the pressure vessel of FIG. 8, with a portion of the body removed for clarity to show some internal components.

FIG. 8 is a perspective side view of another embodiment of a modular pressure vessel 100A, with a portion of the body (e.g. center section 1 and end-cap 10) removed for clarity showing internal components. The body may include the wall 1A of the center section 1, and/or other features of the pressure vessel 100. FIG. 9 is a schematic top plan view of the pressure vessel 100A with two removable end-caps fastened to the center section.

Referring to FIGS. 8 and 9, the pressure vessel 100A may have the same or similar features and/or functionalities as the pressure vessel 100, and vice versa. The pressure vessel 100A may be the exact same as the pressure vessel 100 but with a compressor and other features inside the pressure vessel 100A, as described herein. The pressure vessel 100 is thus modular and the exact same pressure vessel 100 may be used in many different applications, with various components attached thereto or therein, etc.

As shown in FIGS. 8 and 9, the modular pressure vessel 100A can be configured to encompass the entire air compressor 22. The compressor 22 may be mounted inside the vessel 100A using the vibration isolation system 311 described herein. The compressor 22 may be enclosed completely within the cavity 1D bounded by the center section 1 and end-caps 10, 15 of the enclosed pressure vessel 100A. The two removable end-caps 10, 15 are also shown fastened to the hollow cylindrical center section 1 of the pressure vessel 100.

In some embodiments, an air supply inlet for the air compressor 22 is plumbed to a fitting port 9 through a high-vacuum flexible joint and tube 23. This may allow the air compressor 22 to stay flexible with respect to the center section 1. In some embodiments, atmospheric air enters the fitting port 9 through a valve 24, such as a check valve or electronic solenoid valve. This may allow for blocking pressurized air from inside the pressure vessel 100A from leaking out of the inlet when the air compressor 22 is not running. In some embodiments, air can be supplied to the valve 24 from an externally mounted air filter 25, for example for the purpose of easy filter servicing.

In some embodiments, the incoming air is compressed by the air compressor 22 and then enters the pressurized section of the pressure vessel 100 via the air compressor output port 26. In some embodiments, a high pressure electrical bulkhead 27 can be utilized to pass electrical power and electrical signals through the center section 1 to the compressor 22. The bulkhead 27 may be located at one of the rails 8 of the pressure vessel 100.

In some embodiments, a structural isolator 28 is incorporated. The isolator 28 may be a novel metallic and polymer mounting isolator 28 non-rigidly affixing the air compressor 22, and/or portions thereof such as the compressor head 20 and/or compressor electric motor 21, to the center section 1. Such isolation may reduce or attenuate the noise and dynamic mechanical loads and/or vibration transmitted from the air compressor 22 to the center section 1 and/or end fittings. In other embodiments, the vibration isolation system 311 may be used instead of, or in addition to, the isolator 28.

Figure 10A:
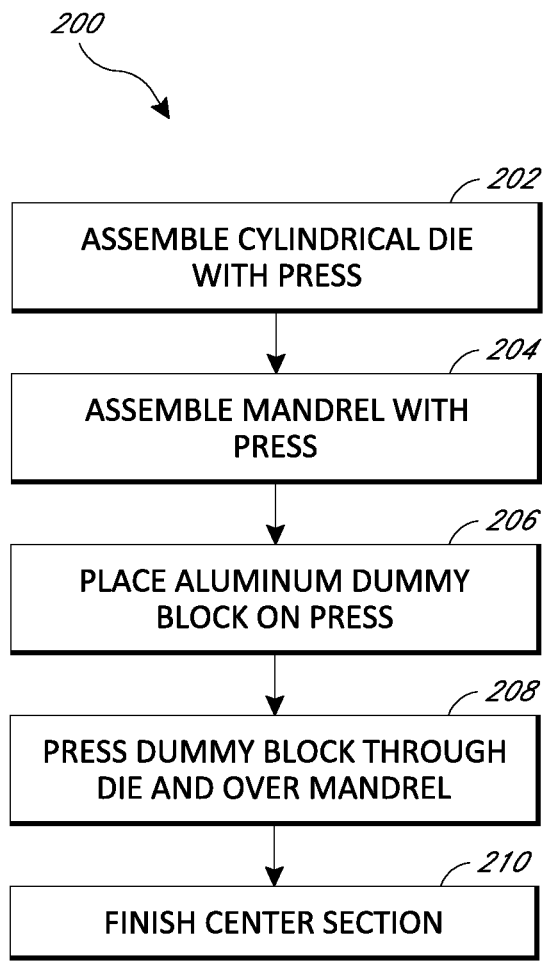
FIGS. 10A-10D are flow charts showing embodiments of methods for manufacturing and/or assembling a modular pressure vessel or components thereof.

In some embodiments, the pressure vessel center section 1 can be manufactured by an extrusion process. FIGS. 10A-10D are flow charts showing embodiments of methods 200, 220, 230, 240 relating to manufacturing and/or assembling the modular pressure vessel 100 or components thereof. FIG. 10A is a flow chart showing an embodiment of a method 200 for manufacturing an embodiment of the center section 1. The method 200 begins with step 202 wherein a die is assembled with an extrusion press. The method 200 then moves to step 204 wherein a mandrel is assembled with the extrusion press machine. The method 200 then moves to step 206 wherein a dummy block is placed on the extrusion press. The method 200 then moves to step 208 wherein the dummy block is pressed through the die. The method 200 then moves to step 210 wherein the center section is finished.

Figure 10C:
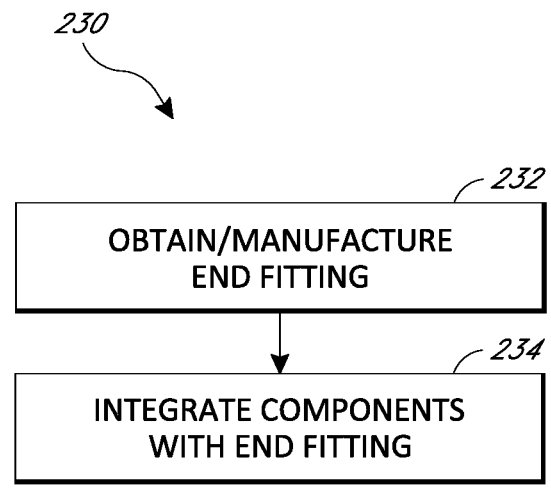
Figure 10B:
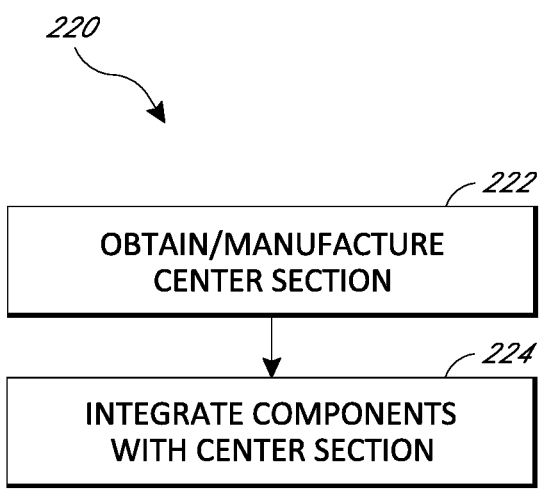

FIG. 10B is a flow chart showing an embodiment of a method 220 for assembling an embodiment of the center section 1. The method 220 may begin with step 222 wherein a center section 1 without any integrated components therein is manufactured or otherwise obtained. Step 222 may be accomplished using the method 200 described in FIG. 10A. The method 220 then moves to step 224 wherein one or more components are integrated with the center section 1.

FIG. 10C is a flow chart showing an embodiment of a method 230 for assembling an embodiment of the end fitting. The method 230 may begin with step 232 wherein an end fitting is manufactured or otherwise obtained. The method 230 may then move to step 234 wherein one or more components may be integrated with the end fitting.

Figure 10D:
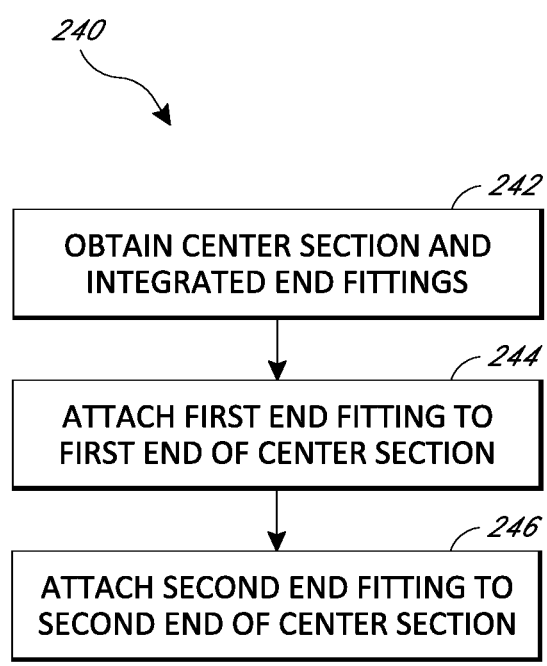

FIG. 10D is a flow chart showing an embodiment of a method 240 for assembling an embodiment of the modular pressure vessel 100. The method 240 may begin with step 242 wherein a center section and one or more end fittings are manufactured or otherwise obtained. The method 240 then moves to step 244 wherein the first end fitting is attached to the center section 1. For example, the end-cap 10 or 15 may be attached to a first end of the center section 1. The method 240 then moves to step 246 wherein the second end fitting is attached to the center section 1.

An embodiment of a vibration isolation system 311 is shown and described with respect to FIGS. 11-14 for a component 308 mounted to a mount 307. The component 308 is shown as an air compressor and the mount 307 is shown as a pressure vessel, with the component 308 mounted inside the mount 307. However, the system 311 may be used in a variety of other arrangements as well as other contexts and applications, some of which are further described herein. Further, the system 311 may be employed in or with the various pressure vessels described herein, such as those shown in and described with respect to FIGS. 1-10D, for example the vessels 100 and 100A.

Figure 11:
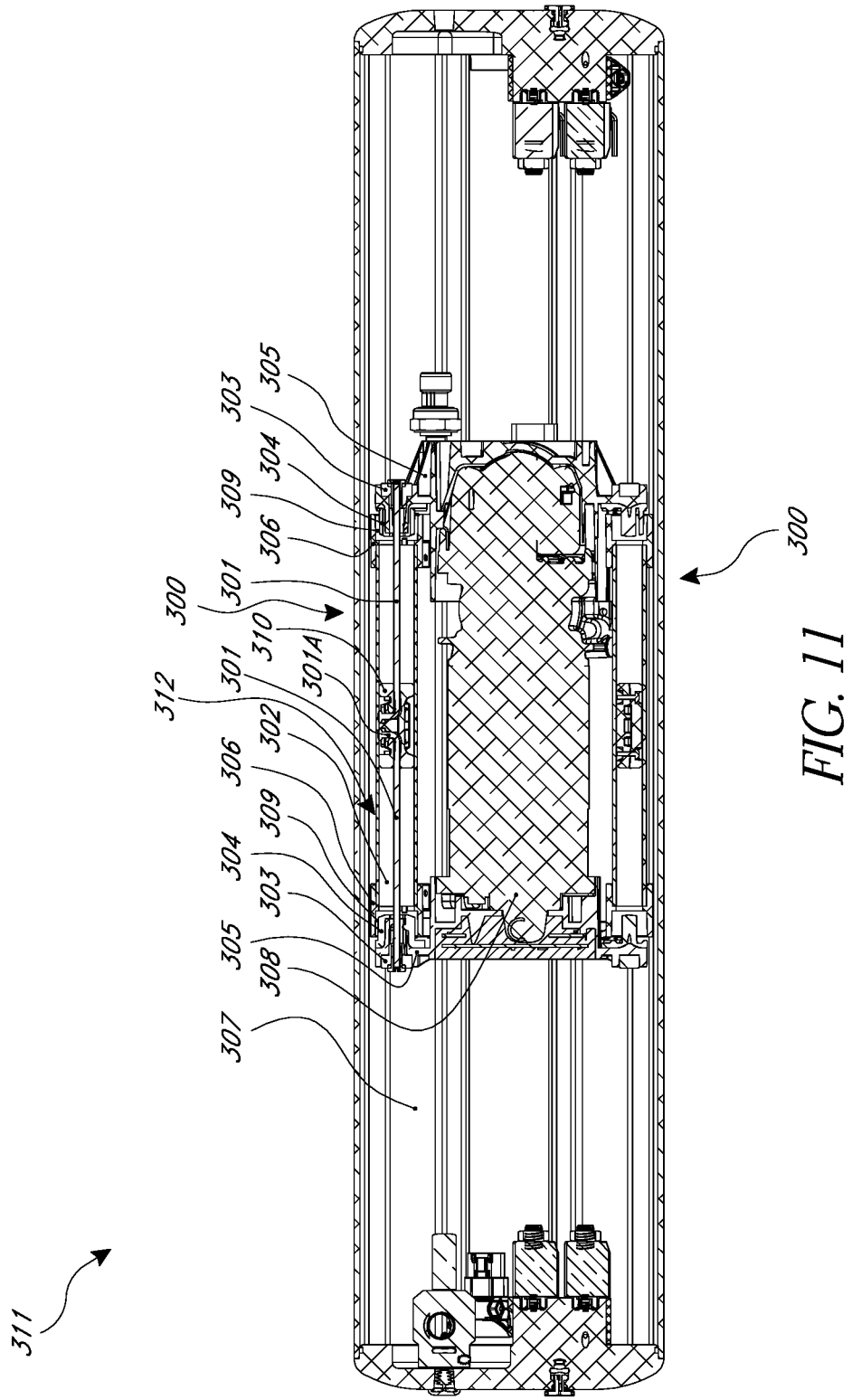
FIG. 11 is a cross-section view of an embodiment of a vibration isolation system mounting an air compressor inside an air tank, such as the pressure vessel described with respect to FIGS. 1-10D.
Figure 12:
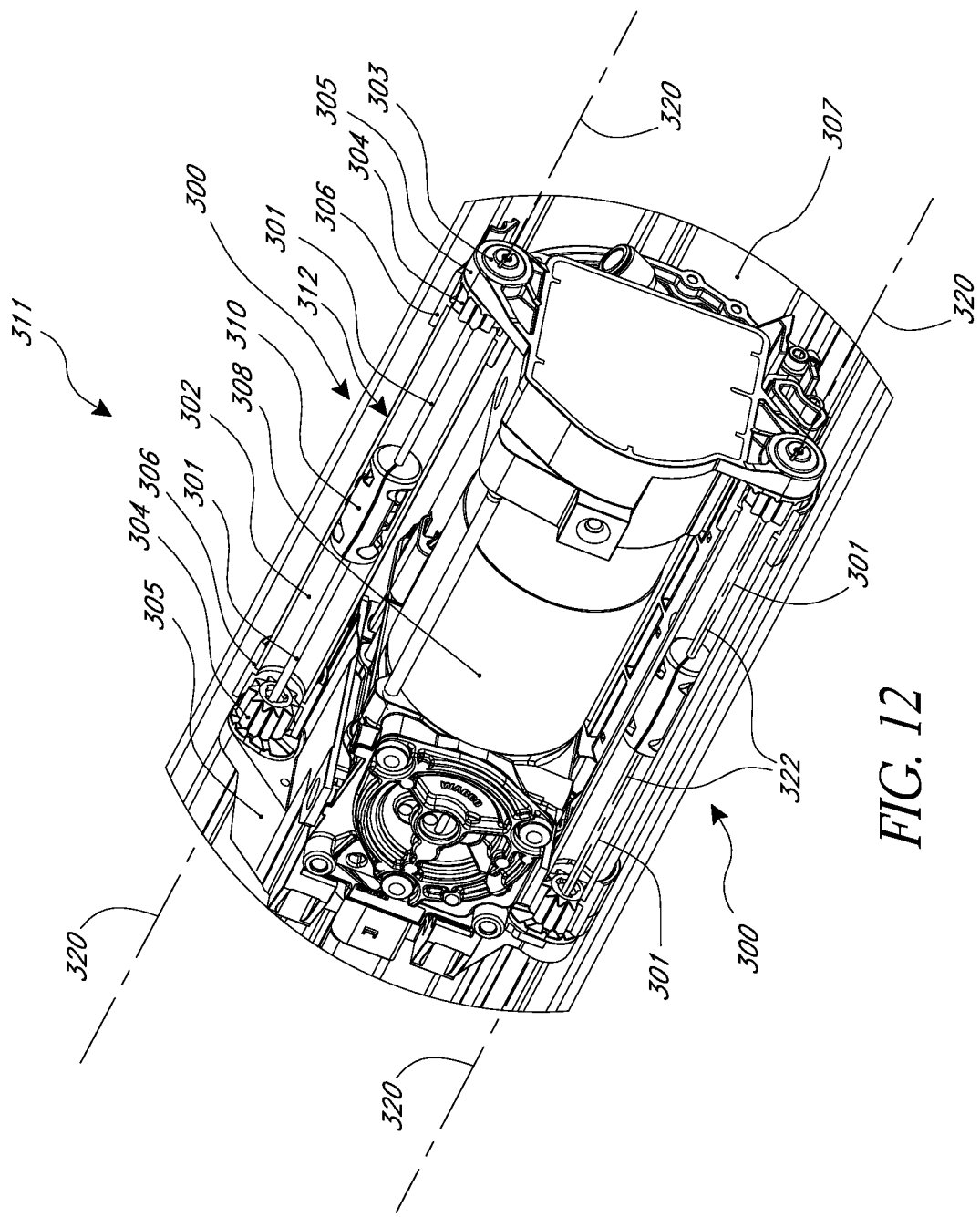
FIG. 12 is a perspective view of the vibration isolation system of FIG. 11.
Figure 13:
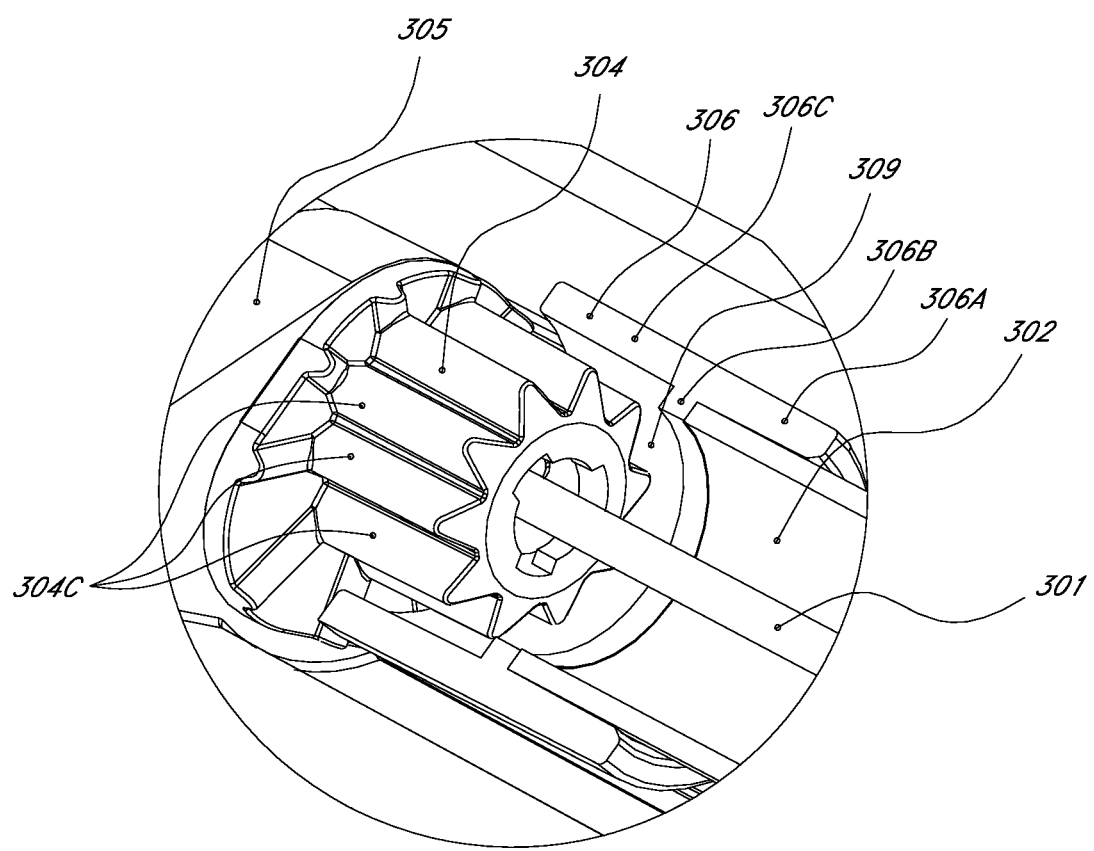
FIG. 13 is a detail view of one of the attachment locations between the air tank and compressor of FIGS. 11-12, with some features shown in cross-section.
Figure 14:
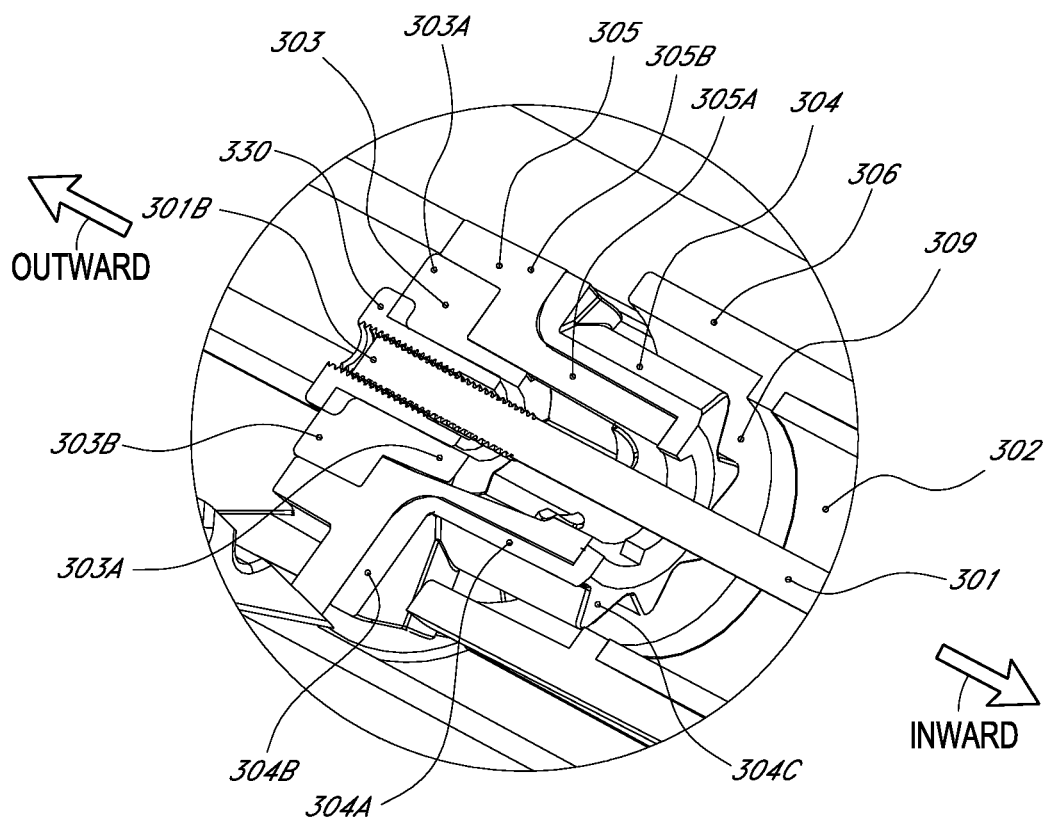
FIG. 14 is a cross-section view of the attachment location of FIG. 13.

FIG. 11 is a cross-section view of an embodiment of the vibration isolation system 311 mounting the component 308 (embodied here as an air compressor) to and within the mount 307 (embodied here as an air tank). The mount 307 may be the pressure vessel 100 or 100A described with respect to FIGS. 1-10D. FIG. 12 is a perspective view of the vibration isolation system 311. FIG. 13 is a detail view of one of the attachment locations between the mount 307 and the component 308, with some features shown in cross-section. FIG. 14 is a full cross-section view of the attachment features shown in FIG. 13.

The vibration isolation system 311 may include one or more mounting subsystems 300. As shown, there may be two subsystems 300. The subsystems 300 may be located across from each other, or in other locations. There may be less than or more than two subsystems 300. The subsystems 300 may be used to attach the component 308 to the mount 307 and to isolate, e.g. attenuate, any vibrations generated by the component 308 and transmitted to the mount 307.

Each subsystem 300 may suspend the component 308 relative to the mount from respective attachment locations of the mount 307, as further described.

Each subsystem 300 for mounting the component 308 may include one or more of the following: a flexible coupling 303, a bumper stop 304 such as a polymer bump stop, a component attachment 305 such as a compressor mounting bracket for attaching the subsystem 300 to the component 308, a mount attachment 306 such as a tank mounting bracket for attaching the subsystem 300 to the mount 307, a damper 310, and/or an elongated support 312. The elongated support 312 as shown may include one or more a rods 301, such as a spring rod, and/or one or more support tubes 302. As shown, the system 311 includes two subsystems 300, with each subsystem 300 including two flexible couplings 303, two polymer bumper stops 304, a damper 310, and an elongated support 312 that comprises two rods 301 and a support tube 302. Each subsystem 300 may additionally include one or more component attachments 305 and/or one or more mount attachments 306 to which the system 311 is attached. In some embodiments, each subsystem 300 additionally includes one or more of the mount attachments 306, such as the four attachments 306 shown in FIGS. 11-12. The two component attachments 305 may be part of the component 308, as shown in FIGS. 11-12, or these attachments 305 may be part of the subsystem 300.

The system 311 may take up a minimal space and volume. Each subsystem 300 of the system 311 may have an overall length of between ten and fifty inches and an overall width of between one and five inches. In some embodiments, each subsystem 300 of the system 311 may have an overall length of no more than five, ten, fifteen, twenty, thirty, forty, fifty, sixty, seventy, eighty, ninety, one hundred, or two hundred inches. In some embodiments, each subsystem 300 of the system 311 may have an overall width of no more than one, two, three, four, five, six, seven, eight, nine, ten, eleven, twelve, fifteen, twenty, thirty, forty, fifty, sixty, seventy, eighty, or ninety inches. Each subsystem may have any combination of the aforementioned lengths and widths. The aspect ratio of the subsystem 300, defined as the overall length to overall width, may be no less than five, ten, fifteen, twenty, twenty-five, thirty, forty or fifty. These are merely some examples, and other dimensions and aspect ratios may be implemented depending on the application.

The support tube 302 is an elongated, tubular structure. The support tube 302 may be formed of metal, composite, plastic, polymer, other suitable materials, or combinations thereof. The support tube 302 is cylindrical and defines an axis 320 along which the elongated tube extends, as shown in FIG. 12. The support tube 302 may therefore have a circular cross-section as taken perpendicular to the axis 320. In some embodiments, the support tube 302 may have other cross-sectional shapes, such as rounded, polygonal, segmented, other shapes, or combinations thereof. The support tube 302 has a uniform cross-sectional shape along the length thereof. In some embodiments, the cross-sectional shape of the support tube 302 may change along the length thereof. The cross-section of the support tube 302 is a closed profile, for example a closed circular profile as shown. In some embodiments, the cross-section profile may be an open shape at one, some, or all locations along the length thereof.

The damper 310 is located within and supported by the support tube 302. The damper 310 is located at or near the center along the length of the support tube 302. The damper 310 may be located at other locations along the support tube 302. There may be a single damper 310 in each subsystem 300, as shown. In some embodiments, there may be two or more dampers 310 supported along the length of the one or more rods 301 in each subsystem 300. The damper 310 may be a bracket or other suitable component that connects with first ends 301A of the rods 301 on respective sides of the damper 310. The damper 310 may be rigidly connected to the first ends 301A, for example in a cantilevered connection. The damper 310 may be formed of metal, composite, plastic, polymer, other suitable materials, or combinations thereof. The damper 310 may be or have a mass configured to counter oscillations imparted by the rods 301, as further described herein.

The damper 310 is supported by the support tube 302. The damper 310 may be attached, for example rigidly attached, to the support tube 302, for example with fasteners, etc. Alternatively or in addition, in some embodiments, the damper 310 may have a friction or interference fit within the support tube 302. Rotation of the support tube 302 may rotate the damper 310. The support tube 302 may rotate about the axis 320 (shown in FIG. 12) to thereby rotate the damper 310 about the axis 320. Rotation of the damper 310 may rotate the rods 310 about the axis 320, as further described.

The support tube 302 surrounds the damper 310. In some embodiments, the damper 310 may surround the support tube 302. In some embodiments, the damper 310 may connect to respective inner ends of two support tubes 302. For each subsystem 300, there is a single support tube 302 that extends between axially separated mount attachments 306, with two rods 301 extending from a single damper 310. In some embodiments, for each subsystem 300, there may be multiple support tubes 302 or multiple segments thereof, one or three or more rods 301, and/or two or more dampers 310. Thus the particular embodiment of the elongated support 312 shown and described herein is merely one example, and other embodiments of the elongated support 312 may be implemented without departing from the scope of the disclosure.

The two rods 301 extend from opposing sides of the damper 310 through the support tube 302 and are rigidly attached, for example in a cantilevered connection, to the component 308 via the respective component attachments 305. In some embodiments, the two rods 301 may be rigidly attached, for example in a cantilevered connection, to the mount 307 via the respective mount attachments 306. The rods 301 may be metal, composite, plastic, polymer, other suitable materials or combinations thereof. The rods 301 may be solid or hollow. The rods 301 each extend in a respective first direction along a respective local axis 322 defined by the respective rod 301. The axes 322 are shown in FIG. 12 for two of the rods 301 in the lower portion of the system 311 as oriented in the figure. The rods 310 are configured to allow for the same bending stiffness in any angular direction. For example, the rods 310 allow for the same bending stiffness about any axis in a plane that is perpendicular to the axis 322. The rod 310 has a circular cross-sectional profile. In some embodiments, the rod 310 may have a different cross-sectional profile at one, some or all locations along the length thereof, such as a rounded, polygonal, segmented, or other suitable profiles. The rods 301 have a first end 301A attached to the damper 310 and a second end 301B from which the component 308 is suspended. The first end 301A is bent within the damper 310 and the second end 301B is straight, as shown in FIGS. 11 and 14. The second end 301B is threaded. In some embodiments, the ends 301A, 301B may have other shapes and/or configurations.

Some embodiments allow the support tubes 302, dampers 310, and/or rods 301 to be re-oriented by the end-user with respect to the mount attachments 306 in order to compensate for the effect of gravity when mounting the assembly at various angles of mounting orientation, as further described. This includes angling the rods 301 to account for deflection due to the weight of the suspended component 308 as well as rotation of the rods 301 to account for different orientations with respect to gravity.

In particular, the rods 301 may be designed to compensate for deflection or misalignment. For example, the rods 301 may have an initial deflection due to the mass of the component 308. This initial deflection may be compensated for by affixing the rods 301 to the support tubes 302 via the dampers 310 at a calculated angle. The axis 322 along which the rod 301 extends may be angled with respect to a longitudinal axis 320 defined by the support tubes 302, shown in FIG. 12. Each rod 301 may extend at an angle with respect to the longitudinal axis 320 in either direction. That is, the rod 301 may be angled at or near the first end 301A or at or near the second end 301B. For instance, the rod 301 may slope up or down from the first end 301A to the second 301B, or vice versa. After the system 311 is installed with the component 308 and mount 307 and allowed to be moved by gravitational forces, the mass of the component 308 deflects the rods 301 back to axial center on all four ends 301A, 301B of the rods 301. This aspect may be critical for achieving equal radial clearance between a stop 304 and a pocket 309, as further described.

Further, the system 311 includes the ability for the elongated support members 312, for example the support tubes 302, to be rotated around the longitudinal axis 320 defined by the support tubes 302, as shown in FIG. 12. Rotation of the support tubes 302 may re-orient the angled rods 301. For example, one or more of the axes 322 of the rods 301 may be angled with respect to the axis 320 defined by the support tube 302 surrounding the rod 301, as described. The angle of the rods 301 may be re-oriented to counteract a different angle of gravity with respect to the entire system 311. Thus, rotation of the support tube 302 may rotate, or cause rotation of, the one or more rods 301 within the respective support tube 302 to change the first direction along which the rod 301 extends to a second direction that is different from the first direction. After rotation, the axis 322 of the rod 301 may extend at a second angle with respect to the axis 320 of the support tube 302 that is the same as the first angle before rotation, albeit now in a different direction. Thus the axis 322 of the rod 301 may in effect be rotated about the axis 320. In some embodiments, this second angle may be different from the first angle. This rotational capability allows the entire assembly—including the component 308, the mount 307 and the system 311—to be installed at any angle with respect to the gravity vector, and then the support tubes 302 can be rotated to keep the component 308 in the proper design position.

The mount attachment 306 attaches to and supports the system 311. The mount attachment 306 attaches to the support tube 302, as shown in FIGS. 13 and 14. The mount attachment 306 includes a first annular wall 306A extending from an inward lip 306B toward the support tube 302 and a second annular wall 306C extending in the opposite direction from the lip 306B. The wall 306A defines a cavity in which the support tube 302 is received. Other attachment configurations may be implemented. The support tube 302 may be rotatably attached to the mount attachment 306, for example within the cavity defined by the wall 306A. An end of the support tube 302 may bottom out on the lip 306B. The wall 306C may define the pocket 309. The pocket is a cylindrical opening on a side of the mount attachment 306 that faces away from the damper 310 and receives therein the stop 304, as further described herein.

The walls 306A, 306C and lip 306B define an opening through the mount attachment 306. The rod 301 extends through this opening such that the second end 301B is located on an axially outward side of the mount attachment 306. In some embodiments, the second end 301B may be located on an axially inward side of the mount attachment 306. The "axially inward" and "axially outward" directions are indicated respectively by the direction arrows "inward" and "outward" as shown in FIG. 14. Thus, the "axially inward" side of the mount attachments 306 refers to the space located between the pair of axially separated mount attachments 306 (see FIGS. 11-12), and the "axially outward" side is located on the opposite sides of the respective mount attachments 306. The rods 301 thus suspend the component 308 on the axially outward sides of the mount attachments 306. In some embodiments, the rods 301 may suspend the component 308 on the axially inward sides of the mount attachments 306.

The mount attachment 306 may be a fitting, flange, or other structural attachment, that is coupled with the mount 307. "Coupled" as used herein includes attachment of a separate part, either directly or indirectly, or integral with a part. In some embodiments, the mount attachment 306 may be attached to or be part of the rails 2, 8, which are described herein with respect to FIGS. 1-10D. The mount attachment 306 may extend from the rails 2, 8. The mount attachment 306 may be a fitting that attaches to the rails 2, 8 of the pressure vessel 100, 100A. The mount attachments 306 may be removeably attached to the mount 307, such that the mount attachments 306 may be attached at different locations of the mount 307. This may allow for re-orienting the component 308 to a desired orientation with respect to the mount 307 and/or to the direction of gravity.

The mount 307 may be rigidly attached to, or be a part of, a vehicle or other object. In some embodiments, the mount 307 may be a chassis or frame of a vehicle such as a support related to supporting a compressor for an automotive air suspension system. In some embodiments, the mount 307 may be a structural support in a factory, garage, or airplane, a mount for a portable air system, a support for an auxiliary air supply system, a frame for a central air supply unit in industrial distributed air supply infrastructures, or other types of mounts.

The component 308 is attached to ends 301B of the rods 301 from which the component 308 is suspended. The component 308 attaches to the rods 301 via four flexible couplings 303 which are mated to the component 308 via the component attachments 305. The component attachments 305 may be fittings or other structural connections attached to, or integral with, the component 308. The component attachments 305 may be part of a structural frame that is configured to attach to the component 308. The component attachment 305 may provide a rigid connection such that vibrations from the component 308 are transmitted to the system 311 via the rods 301.

As shown in FIG. 14, the component attachments 305 include an inward section 305A that extends axially inward and an outward section 305B that extends axially outward. The sections 305A, 305B may be rounded, for example circular or other shapes. The inward section 305A is received within the stop 304, which is located within the pocket 309. The outward section 305B receives the coupling 303 therein. The sections 305A, 305B define an opening through which the rod 301 extends. The first end 301B of the rod 301 is located within this opening of the component attachment 305. A portion of the first end 301B within the outward section 305B is attached to the coupling 303 via a threaded bushing 330. The threaded connection prevents translation of the bushing 330 in an axial direction relative to the rod 301. The bushing 330 has a flange on an axially outward side thereof to prevent translation of the coupling 303 axially outward relative to the bushing 330. The bushing 330 may be separate or integral with the coupling 303.

The coupling 303 has a flange 303A on an axially outward side thereof to prevent translation of the coupling 303 axially inward relative to the component attachment 305. Thus, any inward force on the rod 301, for example due to bending due to vibrations, is transmitted through the threaded connection with the bushing 330 and to the coupling 303, which sits within the outward section 305B of the component attachment 305. In this manner, the rod 301 is free to bend, and to extend in an axially inward direction from the coupling 303 at an angle relative to the axis 320, while the coupling 303 prevents axially inward translation of the rod 301. The coupling 303 may be flexible to allow for such bending and/or angling and attenuate any forces imparted to the system 311 by such movements. The coupling 303 may be flexible to allow for some axial compression of the coupling 303. The flexible couplings 303 may thus accommodate any change in angle and/or change in length of the rod 301, for example if the rod 301 is adjusted during assembly or while the rod 301 bends during operation. The coupling 303 may have a hole extending therethrough and through which the rod 301 extends.

The stop 304 is located within the pocket 309 of the mount attachment 306. The stop 304 has an inward section 304A extending axially inwardly from a flange 304B. The flange 304B bottoms out on the outward section 305B of the component attachment 305. The inward section 304A is rounded, for example circular or other rounded shapes. The inward section 304A of the stop 304 surrounds and receives therein the inward section 305A of the component attachment 305. The stop 304 is thus prevented by the component attachment 305 from translating in an axially outward direction. The stop 304 is formed of a polymer. In some embodiments, the stop 304 may be metallic, plastic, composite, other suitable materials, or combinations thereof. The stop 304 may be axially compressible. The stop 304 may be radially compressible. The radially inner surface of the inward section 304A may be cylindrical or other rounded shapes. The radially inner surface of the inward section 304A may complement the radially outer surface of the component attachment 305 for a secure connection.

There is a gap between the outer surface of the stop 304 and the inner surface of the pocket 309. The stop 304 does not touch the pocket 309 when at rest or within a certain range of vibratory loads. The surrounding pocket 309 is radially larger than the maximum radial width of the stop 304 to create the gap therebetween. This gap may have a radial length, for example, equal to the primary isolation amplitude. In some embodiments this radial length is equal to 0.100 inches, about 0.100 inches, or equal to 0.100 inches+/−25%. This embodiment may allow the primary vibration isolation to take place utilizing only or primarily the rods 301 and without interference or substantial interference from the stops 304. When the assembly is subjected to large impacts the amount of displacement of the component 308 is then restricted when the stops 304 come into contact and bottom out into the pockets 309. In some embodiments, the radial width of an annular gap, located between the outer width of the stop 304 and the inner width of the pocket 309 when assembled together, may be uniform around the entire circumference of the pocket 309. In some embodiments, this annular gap may not be uniform. The outer surface of the inward section 304A of the stop 304 is rounded with multiple radial protrusions 304C. The protrusions 304C define locations of maximum radial width. The annular gap may be measured from these locations. The outer surface of the stop 304 may have other rounded shapes, such as cylindrical, or other suitable shapes. In some embodiments, the pocket 309 may have a complementary shape, for example with radially inward protrusions, such that the maximum radial width of the stop 304 is actually greater than the minimum radial width of the pocket 309, yet the stop 304 may still not contact the pocket 309 when at rest or within a range of vibratory loads or shocks to the system 311.

The shape of the stops 304 may contribute to the multidirectional stiffness of the system 311. The rods 301 and/or stops 304 may have round cross sections. The round cross sections may provide equal stiffness at any rotation angle relative to the axial direction of the rods 301 and stops 304. This property may allow the rods 301 and stops 304 to provide multidirectional, for example omnidirectional, primary and secondary isolation allowing the assembly of the component 308 and subsystem 311 to be mounted in any rotation with respect to gravity and yield the same level of isolation performance.

The vibration isolation system 311 may provide for stiffness and damping of the vibrating component 308. The rods 301 may provide stiffness to the system 311. The rods 301 may support the component 308 at an axially outward side of the mount attachments 306 such that the portions of the rod 301 located on the axially outward side of the mount attachments 306 behave as cantilevered beams suspending the component 308 therefrom. The portion of the rod 301 located on the axially inward side of the mount attachments 306 may behave as a simply supported beam.

The support tube 302 may provide stiffness to the system 311. The support tube 302 may support the rods 301, via the damper 310, between the mount attachments 306. For example, the stop 304 may be centered within the pocket 309. Thus, the support tube 302 may entirely support the component 308 through the damper 310, the rods 301, and the couplings 303 such that the stops 304 are not in contact with the mount attachment 306 in a free state, for example where the component 308 is turned off or is otherwise not vibrating. Within certain vibrational loads, this condition may also be met. The support tube 302 may therefore behave as a simply supported beam attached, for example in a cantilevered connection, at either end to respective mount attachments 306.

The damper 310 may provide damping to the system 311. The damper 310 may be or have a mass configured to counter oscillations of the elongated support 312, such as oscillations of the rods 301 and/or support tube 302. The damper 310 may therefore resist motion of the vibrating parts to absorb and dissipate energy and thereby attenuate vibrations. The mass of the damper 310 may be chosen based on the particular application and requirements. For example, the system 311 may use a heavier or lighter mass of the damper 310, a damper 310 that extends along a longer or shorter length of the support tube 302, a damper 310 with a compressed or spread out distribution of mass along the length of the support tube 302, etc. as dictated by the particular requirements. In some embodiments, the damper 310 may have a variable mass, such that mass, for example weights, may be added to or taken from the damper 310 for particular applications and requirements.

A load path imparted by the vibrating component 308 extends from the component 308, to the system 311, and to the mount 307. The load path may extend from the component 308, to the elongated support 312, and to the mount 307. The load path may extend from the component 308, to the rod 301, to the support tube 302, and to the mount 307. The load path may extend from the component 308, to the rod 301, to the damper 310, to the support tube 302, and to the mount 307. The load path may extend from the component 308, to the coupling 303, to the rod 301, to the damper 310, to the support tube 302, and to the mount 307. The load path may extend from the component 308, to the coupling 303 and stop 304, to the rod 301, to the damper 310, to the support tube 302, and to the mount 307. Each of these or other load paths may exist at each attachment location between the component 308 and the mount 307, for example at each of the four attachment locations shown in FIGS. 11-12.

These are merely some example embodiments and configurations. Other embodiments and configurations may be implemented that achieve the intended vibration isolation. For example, in some embodiments, the support tube 302 may connect to the mount attachment 306 on an axially outward side of the mount attachment 306. In some embodiments, the mount attachment 306 may be located on an axially outward side of the component attachment 305. In some embodiments, there may be a single, continuous rod 301 in each isolation subsystem 300. These and other modifications will be apparent to one of ordinary skill in the art.

The vibration isolation system 311 may be used with the various pressure vessels described in FIGS. 1-10D or the vessels as more fully described in U.S. patent application Ser. No. 15/694,701, filed Sep. 1, 2017, and titled "Systems, Devices and Methods for Modular Pressure Vessels," the entirety of which is incorporated herein by reference for all purposes and forms a part of this specification. In this use case, the component 308 is the compressor, which along with the vibration isolation system 311 is located internally of the mount 307 (i.e. within the air reservoir). The system 311 may be applied to a more conventional configuration with the compressor located external of the air reservoir.

The system 311 may be used in a variety of other contexts and applications, some of which are described here. The vibration isolation system 311 may be used with an automotive air suspension system. This system requires an air management system in order to fill and empty the vehicle's air springs and in turn control the height of the vehicle. This air management system typically includes one or more air reservoirs (pressure vessels), one or more electric air compressors, an electronic solenoid valve unit, and an electronic control unit. These components are sometimes mounted individually throughout the vehicle or mounted in combination using a bracket system such as the EXO™ mount system from AccuAir (San Luis Obispo, Calif., USA). AccuAir's modularly constructed pressure vessel invention simplifies the packaging of a vehicle air management system by providing an all in-one package with either conventional externally mounted components (electric air compressors, electronic solenoid valve unit, and electronic control unit), or entirely internally integrated components (electric air compressor and electronic solenoid valves).

The vibration isolation system 311 may be used with an auxiliary air supply system. Many automotive enthusiasts choose to mount such auxiliary air supply systems to their vehicle for the purpose of inflating their tires or powering a variety of pneumatic tools or devices. This typically requires one or more air reservoirs (pressure vessels), one or more electric air compressors, and sometimes a means for controlling the stored air such as an electronic solenoid valve unit.

The vibration isolation system 311 may be used with a small, portable air supply system. Such air supply systems can be found in garages, on job sites, or in factories for the purpose of filling up tires, sports equipment, or powering pneumatic tools or devices. These portable air supply systems usually consist of an air compressor, a reservoir, and a pressure control switch all mounted to one another. Existing systems are very noisy due to the externally mounted air compressor and they are not visually appealing. The vibration isolation system 311 may attenuate vibrations and noise in a more aesthetically pleasing manner.

The vibration isolation system 311 may be used with industrial distributed air supply infrastructures. Such infrastructures are utilized to supply pneumatic power to multiple pieces of equipment around factories. These systems usually consist of a central air supply unit that is then distributed long distances through pneumatic plumbing around the factory to supply air to each of the pieces of equipment. vibration isolation system 311 may be used with AccuAir's modularly constructed pressure vessel. This approach eliminates the cost of long distance plumbing infrastructures and expedites the time and reduces the cost required when a piece of equipment needs to be relocated in the factory while providing a quieter system.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope. The use of particular terminology when describing certain features or aspects of the invention should not be taken to imply that the terminology is being re-defined herein to be restricted to including any specific characteristics of the features or aspects of the technology with which that terminology is associated.

Various modifications and changes may be made without departing from the scope of the described technology. Such modifications and changes are intended to fall within the scope of the embodiments. Parts included in one embodiment are interchangeable with other embodiments; one or more parts from a depicted embodiment may be included with other depicted embodiments in any combination. For example, any of the various components described herein and/or depicted in the figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open"

terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A vibration isolation system for mounting a compressor to a vehicle, the system comprising:
    an elongated support tube extending from a first end to a second end, each end configured to couple with a mount of the vehicle;
    a bracket configured to be supported along the length of the elongated support tube;
    a first rod configured to couple with and extend from the bracket in a first direction along the elongated support tube to a first end of the first rod;
    a first stop configured to couple with a first attachment of the compressor and to be located between the first attachment of the compressor and a first attachment of the mount of the vehicle, the first stop configured to at least partially receive the first rod therethrough; and
    a first coupling configured to attach to the first end of the first rod and to the first attachment of the compressor.

2. The vibration isolation system of claim 1, further comprising:
    a second rod configured to couple with and extend from the bracket in a second direction that is different from the first direction along the elongated support tube to a first end of the second rod;
    a second stop configured to couple with a second attachment of the compressor and to be located between the second attachment of the compressor and a second attachment of the mount of the vehicle, the second stop configured to at least partially receive the second rod therethrough; and
    a second coupling configured to attach to the first end of the second rod and to the second attachment of the compressor.

3. The vibration isolation system of claim 1, wherein the first stop is configured to be received into a pocket of the first attachment of the mount of the vehicle, the pocket having an inner radial width that is greater than an outer radial width of the first stop.

4. The vibration isolation system of claim 1, wherein the first rod extends along a longitudinal axis and has an equal bending stiffness about two or more axes that are located in a plane that is perpendicular to the longitudinal axis.

5. The vibration isolation system of claim 1, wherein the elongated support tube extends along an axis, the first direction in which the first rod extends from the bracket is at an angle with respect to the axis, the elongated support tube is configured to rotate to cause the first rod to extend from the bracket in a second direction with respect to the axis, and wherein the second direction is different from the first direction.

6. A vibration isolation system for mounting a compressor to a vehicle, the vehicle having a first attachment spaced axially from a second attachment, the system comprising:
an elongated support extending along an axis from a first end to a second end, the first and second ends of the elongated support respectively configured to have a cantilevered connection at the first and second attachments of the vehicle, and the elongated support configured to support the compressor near the first and second ends of the elongated support; and
a damper configured to be supported by the elongated support at a location along a length of the elongated support between the first and second attachments, wherein the damper is configured to counter oscillations of the elongated support due to vibrations from the compressor.

7. The vibration isolation system of claim 6, wherein the first and second attachments of the vehicle each have an axially inward facing side and an opposite axially outward facing side, the damper is configured to be supported by the support member at a location on the axially inward facing sides of the first and second attachments, and the elongated support is configured to support the compressor at locations of the elongated support that are on the axially outward facing sides of the first and second attachments.

8. The vibration isolation system of claim 7, wherein the elongated support comprises:
a support tube configured to be coupled with the first and second attachments of the vehicle; and
one or more elongated rods extending through the support tube, the one or more elongated rods configured to extend through the first and second attachments of the vehicle and to support the compressor at locations on the axially outward facing sides of the first and second attachments.

9. The vibration isolation system of claim 8, further comprising one or more stops, wherein the one or more elongated rods are configured to couple with and be axially restrained by the one or more stops, and the one or more stops are configured to be located on the axially outward facing sides of the first and second attachments.

10. The vibration isolation system of claim 8, wherein the one or more elongated rods comprises a first rod and a second rod, the first rod configured to extend from the damper in a first direction to a first end of the first rod that is located on the outward facing side of the first attachment of the vehicle, and the second rod configured to extend from the damper in a second direction that is different than the first direction to a first end of the second rod located on the outward facing side of the second attachment of the vehicle.

11. The vibration isolation system of claim 6, further comprising one or more stops, wherein the elongated support is configured to couple with and be axially restrained by the one or more stops near the first and second attachments of the vehicle.

12. The vibration isolation system of claim 11, wherein the elongated support comprises a support tube and one or more elongated rods, and the one or more stops are configured to be located between the first and second attachment of the vehicle and a respective first and second attachment of the compressor.

13. The vibration isolation system of claim 6, wherein the elongated support comprises a support tube and one or more rods, wherein the support tube is configured to extend along the axis, and the one or more rods are configured to extend at a first angle to the axis in a first direction prior to attaching the compressor to the vehicle, to account for deflections of the one or more rods due to the weight of the compressor.

14. The vibration isolation system of claim 13, wherein the support tube is configured to rotate to thereby cause the one or more rods to extend at a second angle to the axis in a second direction, where the second direction is different from the first direction.

15. The vibration isolation system of claim 6, wherein the elongated support comprises one or more rods, each of the one or more rods each configured to extend along a respective longitudinal axis and having an equal bending stiffness about two or more axes that are located in a plane that is perpendicular to the respective longitudinal axis.

16. A vibration isolation system for mounting a component to a mount associated with a vehicle, the mount having a first attachment spaced axially from a second attachment, the first and second attachments of the mount each have an axially inward facing side and an opposite axially outward facing side, the system comprising:
an elongated support extending axially from a first end to a second end with a middle portion located between the first and second ends, the elongated support configured to extend between and to be supported by the first and second attachments with the middle portion located between the first and second attachments, and with the first and second ends respectively supporting the component at locations on the axially outward facing sides of the first and second attachments; and
a damper configured to be supported by the middle portion of the support member, wherein the damper is configured to counter oscillations of the elongated support due to vibrations from the component.

17. The vibration isolation system of claim 16, wherein the middle portion of the elongated support is configured to behave mechanically as a simply supported beam.

18. The vibration isolation system of claim 16, wherein the elongated support comprises:
a support tube configured to be coupled with the first and second attachments of the mount; and
one or more elongated rods extending through the support tube, the one or more elongated rods configured to extend through the first and second attachments of the mount and to support the component at locations on the axially outward facing sides of the first and second attachments.

19. The vibration isolation system of claim 16, wherein the elongated support comprises a support tube and one or more rods, wherein the support tube is configured to extend axially, and the one or more rods are configured to extend at an angle to the support tube prior to attaching the component to the mount, to account for deflections of the one or more rods due to the weight of the component.

20. The vibration isolation system of claim 16, wherein the elongated support comprises one or more rods, each of the one or more rods configured to extend along a respective longitudinal axis and having an equal bending stiffness about two or more axes that are located in a plane that is perpendicular to the respective longitudinal axis.

* * * * *